(12) United States Patent
Tiedemann

(10) Patent No.: US 10,277,283 B2
(45) Date of Patent: Apr. 30, 2019

(54) NFC DEVICE, READER/WRITER DEVICE AND METHODS FOR AUTHORIZING AND PERFORMING AN UPDATE

(71) Applicant: Sony Corporation, Tokyo (JP)

(72) Inventor: Stephen Tiedemann, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/681,511

(22) Filed: Aug. 21, 2017

(65) Prior Publication Data

US 2018/0076855 A1   Mar. 15, 2018

(30) Foreign Application Priority Data

Sep. 14, 2016 (EP) .................................. 16188740

(51) Int. Cl.
*H04B 5/00* (2006.01)
*G06F 9/54* (2006.01)
*H04W 4/80* (2018.01)

(52) U.S. Cl.
CPC ............ *H04B 5/0056* (2013.01); *G06F 9/54* (2013.01); *H04B 5/0031* (2013.01); *H04W 4/80* (2018.02)

(58) Field of Classification Search
CPC ....... H04B 5/0056; H04B 5/0031; G06F 9/54; H04W 4/008
USPC ........................................................ 455/41.1
See application file for complete search history.

(56) References Cited

U.S. PATENT DOCUMENTS

| 2005/0073417 | A1* | 4/2005 | Mathewson, II | .... G06Q 20/203 340/572.1 |
| 2012/0092137 | A1* | 4/2012 | Buscemi | ............ G06K 7/10297 340/10.51 |
| 2012/0322370 | A1* | 12/2012 | Lee | ........................ H04L 67/141 455/41.1 |
| 2012/0322371 | A1* | 12/2012 | Lee | ..................... H04M 1/7253 455/41.1 |
| 2014/0227976 | A1 | 8/2014 | Callaghan et al. | |
| 2015/0116095 | A1* | 4/2015 | Chadbourne | ........ G06K 19/073 340/10.51 |
| 2015/0134970 | A1 | 5/2015 | Jang et al. | |
| 2015/0261521 | A1 | 9/2015 | Choi et al. | |
| 2017/0005996 | A1* | 1/2017 | Yu | ........................ H04L 63/0428 |
| 2017/0171949 | A1* | 6/2017 | Kim | ........................ F21V 29/74 |
| 2017/0201650 | A1* | 7/2017 | Mikami | ............... H04N 1/4426 |
| 2017/0272591 | A1* | 9/2017 | Odaira | ............... H04N 1/00477 |
| 2018/0146367 | A1* | 5/2018 | Altin | ..................... H04W 12/04 |

* cited by examiner

*Primary Examiner* — Edward F Urban
*Assistant Examiner* — Max Mathew
(74) *Attorney, Agent, or Firm* — XSENSUS LLP

(57) ABSTRACT

An NFC device comprises a function unit configured to execute a function based on related command code, a storage unit configured to store the command code, a communication unit configured to communicate with another NFC device, and a processing unit configured, if an update of the command code shall be made by the another NFC device, to calculate a checksum over at least part of the command code, to compare the calculated checksum with a checksum received from the another NFC device and to authorize the update if the received checksum matches the calculated checksum.

19 Claims, 4 Drawing Sheets

NFC DEVICE, READER/WRITER DEVICE AND METHODS FOR AUTHORIZING AND PERFORMING AN UPDATE

BACKGROUND

Field of the Disclosure

The present disclosure relates to an NFC device and to a reader/writer device. The present disclosure relates further to a method for authorizing an update of a NFC device and to a method for performing an update of a NFC device.

Description of Related Art

An NFC (Near Field Communication) tag device, as one embodiment of an NFC device, is an embedded device with NFC interface (also called communication unit herein). An external NFC reader device, as one embodiment of a reader/writer device, can send specific commands to invoke functions on the NFC tag device, for example to read or write memory cells. Memory cells can also be modified by the microprocessor built into the NFC tag device. Functionality can be built into the NFC tag device to accept new command code through the NFC interface, for example to replace the existing command code with a different version. Such update can modify the future behavior of the NFC tag device and may even lead to rendering the device unusable. It is thus important that command code updates are reliably authorized, e.g. can only be performed by the legitimate owner of the device.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide an NFC device and a reader/writer device that ensure that updates of command code of the NFC device is authorized and that malicious modifications are prevented.

It is a further object to provide a corresponding method for authorizing an update of a NFC device and a corresponding method for performing an update of a NFC device as well as a corresponding computer program for implementing said methods and a non-transitory computer-readable recording medium for implementing said methods.

According to an aspect there is provided an NFC device comprising:
 a function unit configured to execute a function based on related command code,
 a storage unit configured to store the command code,
 a communication unit configured to communicate with another NFC device,
 a processing unit configured, if an update of the command code shall be made by the another NFC device, to calculate a checksum over at least part of the command code, to compare the calculated checksum with a checksum received from the another NFC device and to authorize the update if the received checksum matches the calculated checksum.

According to a further aspect there is provided a reader/writer device comprising
 a storage unit configured to store command code used by an NFC device to execute a function, and/or a command code indicator indicating the command code, and/or a checksum over at least part of the command code,
 a communication unit configured to communicate with the NFC device,
 a processing unit configured, if an update of the command code of the NFC device shall be made by the reader/writer device, to calculate a checksum over at least part of the stored or indicated command code or to retrieve the stored checksum from the storage unit,
 wherein the communication unit is configured to transmit the checksum to the NFC device and to transmit new command code to the NFC device for updating the command code if an authorization of the update is received from the NFC device.

According to a further aspect there is provided a method for authorizing an update of an NFC device comprising
 calculating a checksum over at least part of command code stored for executing a function by the NFC device, if an update of the command code shall be made by another NFC device
 comparing the calculated checksum with a checksum received from the another NFC device, and
 authorizing the update if the received checksum matches the calculated checksum.

According to a further aspect there is provided a method for performing an update of an NFC device comprising
 calculating a checksum over at least part of command code or retrieving a stored checksum, wherein the command code used by an NFC device to execute a function, and/or a command code indicator indicating the command code, and/or a checksum over at least part of the command code is stored in a storage unit,
 transmitting the checksum to the NFC device, and
 transmitting new command code to the NFC device for updating the command code if an authorization of the update is received from the NFC device.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Embodiments are defined in the dependent claims. It shall be understood that the disclosed methods, the disclosed computer program and the disclosed computer-readable recording medium have similar and/or identical further embodiments as the respective claimed devices, as defined in the dependent claims and/or as disclosed herein.

One of the aspects of the disclosure is to require that, in case of command code updates sent to a dynamically updateable NFC device, the sender (i.e. another NFC device, in particular the reader/writer device, such as an NFC reader device) needs to provide a checksum, such as a cryptographic hash value, that is computed over at least part of the command code version that is the actual command code version of the respective function unit of the NFC device and this shall be replaced (i.e. updated). If the NFC device computes the same checksum (e.g. the same cryptographic hash value) over its presently active (i.e. actual) command code version then the update is authorized and accepted, otherwise it is rejected.

In this context, an NFC device shall be understood broadly as any user device that is able to communicate via NFC. Such NFC devices may include, but are not limited to, an NFC tag device, a wearable user device or an IoT (Internet of Things) device which senses data and transmits it to an external device.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
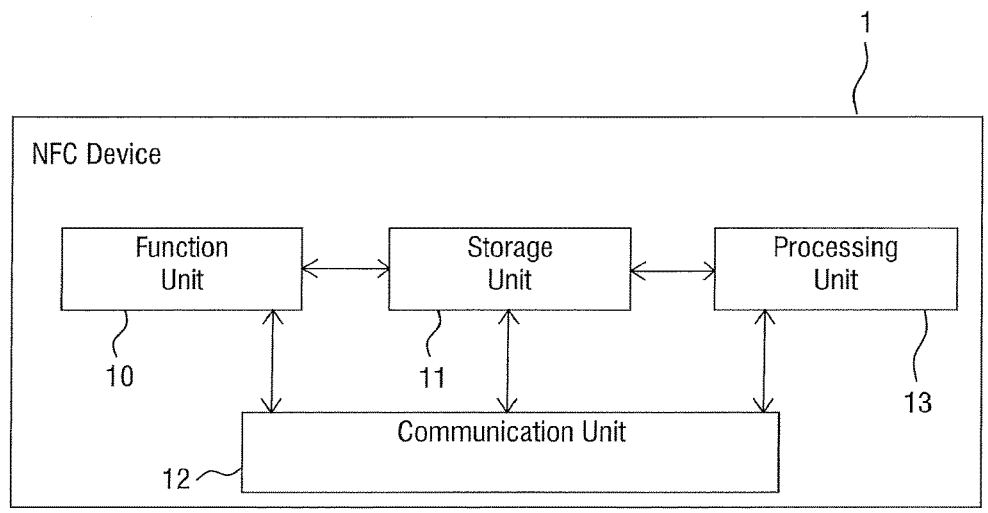
FIG. 1 shows a schematic diagram of a first embodiment of an NFC device and a reader/writer device according to the present disclosure.
Figure 1:
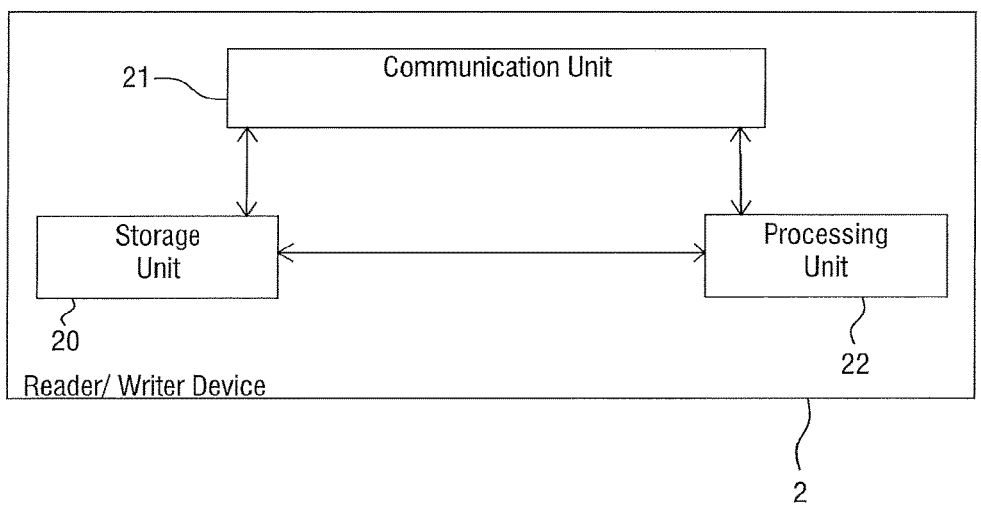
Figure 2:
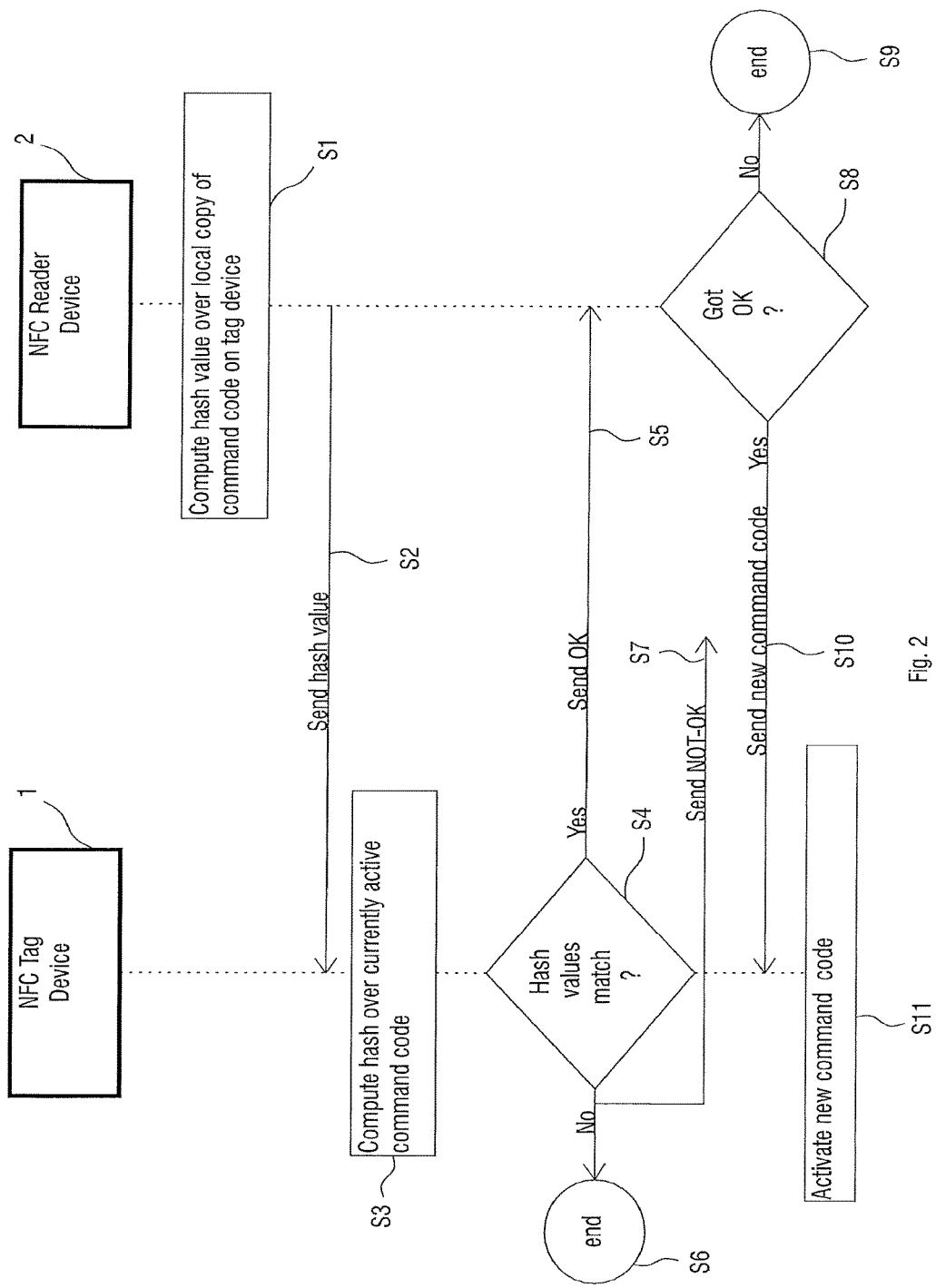
FIG. 2 shows a flow chart of a first embodiment of a method for authorizing and a method for performing an update.

Referring now to the drawings, wherein like reference numerals designate identical or corresponding parts throughout the several views, FIG. 1 shows a schematic diagram of a first embodiment of an NFC device 1 (e.g. a wearable user device) and a reader/writer device 2 (herein also called "another NFC device") according to the present disclosure. FIG. 2 shows a flow chart of a corresponding first embodiment of a method for authorizing an update (as performed by the NFC device 1) and a method for performing an update (as performed by the reader/writer device 2).

The embodiments described in the following will be explained by referring to an application scenario, in which the NFC device is an NFC tag device (as e.g. used in a smart card, such as a Felica card) or an NFC chip (as e.g. embedded in a smartphone) and in which the reader/writer device is a NFC reader/writer for reading/writing such an NFC tag device or NFC chip. The present disclosure is, however, not limited to such application scenarios, but may generally be used with different kinds of wearable user devices and corresponding reader/writer devices, using e.g. other communication interfaces than NFC (e.g. Bluetooth or WiFi).

The NFC device 1 comprises a function unit 10 configured to execute a function based on related command code. The function unit 10 may e.g. be a sensor unit or a processor that are performing a respective function based on dedicated command code, which is stored in a storage unit 11. A communication unit 12 is provided to communicate with the reader/writer device 20, e.g. using NFC, Bluetooth, WiFi or any other communication technology. A processing unit 13 is provided to perform a particular processing if an update of the (active) command code of the function unit 10 shall be made by the reader/writer device 20. Generally, the processing unit 13 calculates a checksum over at least part of the command code, compares the calculated checksum with a checksum received from the reader/writer device and authorizes the update if the received checksum matches the calculated checksum, in particular only if the received checksum matches the calculated checksum. More details of a preferred embodiment of the processing will be explained below with reference to FIG. 2.

The reader/writer device 2 comprises a storage unit 20 configured to store command code used by the NFC device 1 to execute a function, and/or a command code indicator indicating the command code, and/or a checksum over at least part of the command code. A communication unit 21 is provided to communicate with the NFC device 1, i.e. it uses the same communication technology as the communication unit 12 of the NFC device. 1. A processing unit 22 is provided to perform a particular processing if an update of the command code of the function unit 10 of the NFC device 1 shall be made by the reader/writer device 20. Generally, the processing unit 22 calculates a checksum over at least part of the stored or indicated command code or to retrieve the stored checksum from the storage unit. The communication unit 21 transmits the checksum to the NFC device 1 and transmits new command code to the NFC device 1 for updating the command code if an authorization of the update is received from the NFC device 1. More details of a preferred embodiment of the processing will be explained below with reference to FIG. 2.

One example of using the NFC user device as an NFC tag device would be to represent a temperature value sensed by the NFC tag device. The command code that determines the functionality of the NFC tag device is typically generated and provisioned at manufacturing time. However, functionality can also be built into the NFC tag device to accept new command code through the NFC interface, for example by implementation of specific NFC interface commands to replace the existing command code with a different version. Such update can modify the future behavior of the NFC tag device and may even lead to rendering the device unusable. It is thus important that command code updates are reliably authorized, e.g. can only be performed by the legitimate owner of the device, which is addressed by the present disclosure.

As shown in FIG. 2, reader/writer device 2 (here indicated as NFC Reader Device) computes in step S1 a hash value (as one example of a checksum) over a local copy of the command code that is active on the NFC device 1 (here indicated as NFC Tag Device). The computed hash value is transmitted to the NFC device 1 in step S2 using the implemented communication technology, e.g. NFC. The NFC device 1 also computes a hash value (as one example of a checksum using the same algorithm as the reader/writer device 2) over the currently active command code in step S3.

In step S4 the received hash value and the computed hash value are compared by the NFC device 1 to check if they match. If they match, an acknowledgement notice (e.g. an OK message) is transmitted in step S5 to the reader/writer device 2. If they do not match, the process is ended in step S6 and optionally a non-acknowledgement notice (e.g. an NOT-OK message) is transmitted in step S7 to the reader/writer device 2.

In step S8 the reader/writer device 2 checks if it received an acknowledgement notice. If not (or if a non-acknowledgement notice has been received), the process is ended in step S9. If it received an acknowledgement notice, it transmits new command code for updating the currently active command code to the NFC device 1 in step S10 using an implemented communication technology, e.g. NFC. In step S11 the NFC device 1 activates the new command code, i.e. updates the currently active command code by replacing it with the received new command code, which is also stored in the storage unit 11 and from now on used by the function unit 10.

Figure 3:
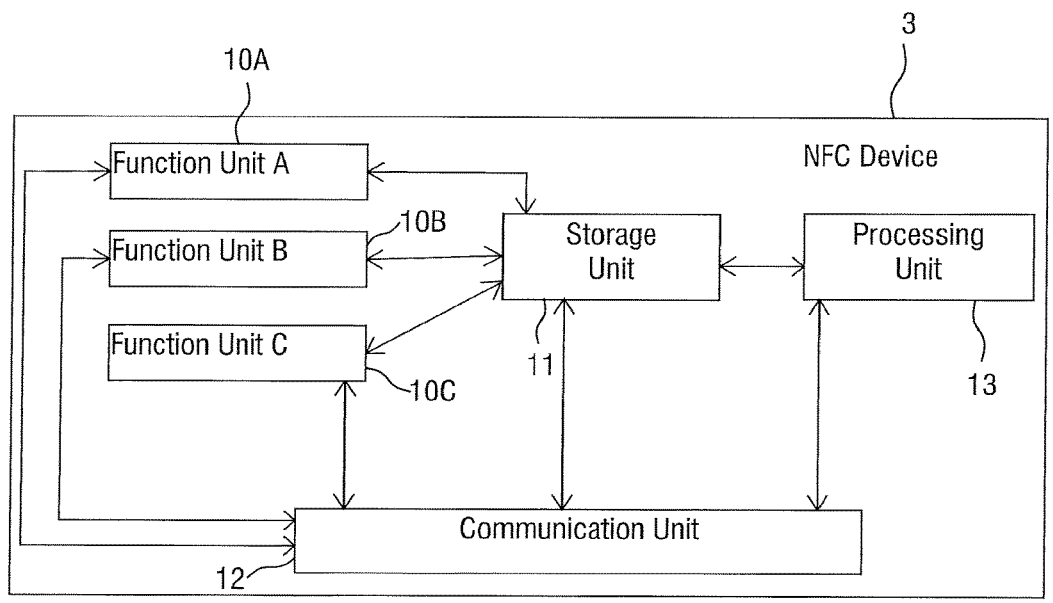
FIG. 3 shows a schematic diagram of a second embodiment of an NFC device and a reader/writer device according to the present disclosure.
Figure 3:
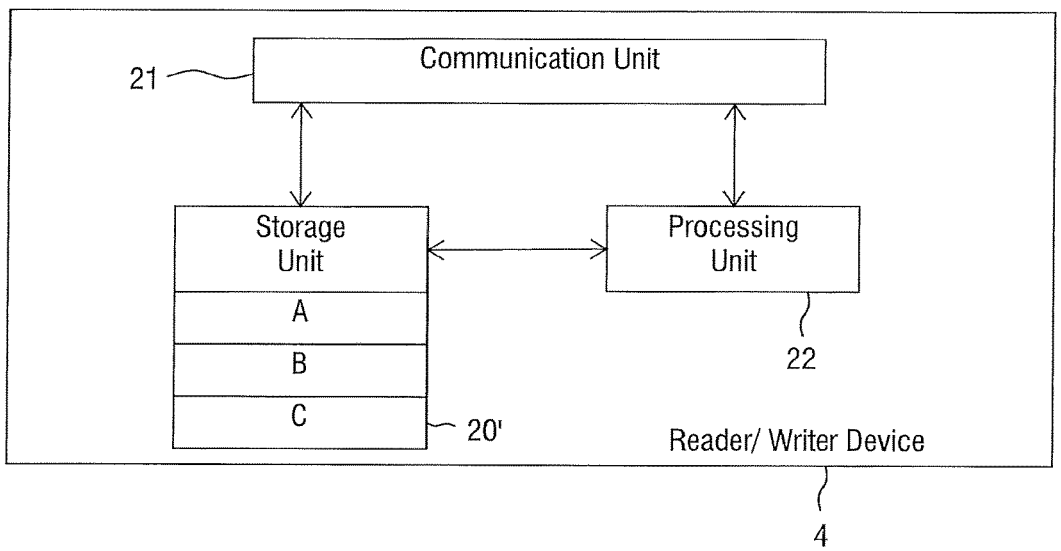
Figure 4:
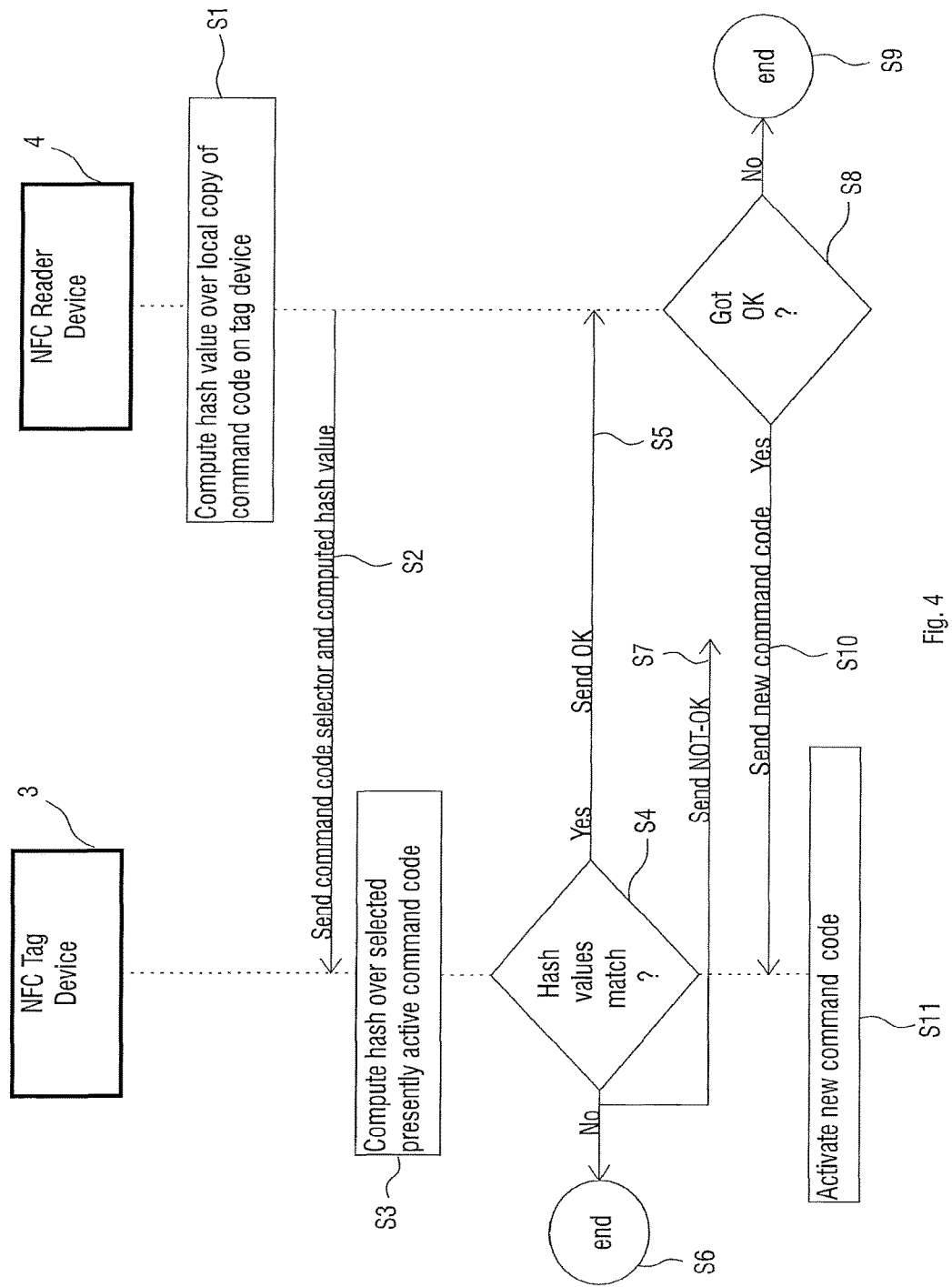
FIG. 4 shows a flow chart of a second embodiment of a method for authorizing and a method for performing an update.

FIG. 3 shows a schematic diagram of a second embodiment of an NFC device 3 and a reader/writer device 4 according to the present disclosure. FIG. 4 shows a flow chart of a corresponding second embodiment of a method for authorizing an update (as performed by the NFC device 3) and a method for performing an update (as performed by the reader/writer device 4).

Compared to the first embodiment, the NFC device 3 comprises two or more (in this example three) function units 10A, 10B, 10C, which are each configured to execute a respective function based on related command code. Such function units may include one or more of a temperature sensor, a humidity sensor, a light sensor, an acceleration sensor, etc. Further, all sorts of communication capability units like WiFi, cellular radio, LoRa (Long Range), etc. may be used. The storage unit 10' of the reader/writer device 4 comprises separate entries A, B, C for the different function units 10A, 10B, 10C, in which, per function unit, the command code used by the NFC device 1 to execute a function, and/or a command code indicator indicating the command code, and/or a checksum over at least part of the command code is stored.

The methods according to the second embodiment as shown in FIG. 4 are rather similar to the methods according to the first embodiment as shown in FIG. 2. In step S1 the hash value is computed over the local copy of a selected command code that is selected to be updated. In step S2 the computed hash value and a command code selector are transmitted to the NFC device 3, which computes a hash value over the selected command code as indicated by the command code selector in step S3. The subsequent procedure is basically identical as in the first embodiment and will thus not be repeated here again.

It shall be noted that generally the storage unit 20, 20' of the reader/writer device 2, 4 may store a local copy of command code that is active at the NFC device 1, 3. However, alternatively, the storage unit 20, 20' stores an indicator to the local copy of the command code, that may actually be stored somewhere else, e.g. on a server or another external memory. Hence, if an update shall be made, the corresponding indicator is taken from the storage unit 20, 20' and used to retrieve the corresponding command code, which is then used for calculating the checksum.

In another embodiment, the storage unit 20, 20' stores only the checksum of the command code that is currently active at the NFC device 1, 3. This checksum may be computed at the reader/writer device 2, 4 each time a new command code is activated at the NFC device 1, 3 and is then stored in the storage unit 20, 20'. If an update shall be made, the corresponding (previously computed) checksum is then taken from the storage unit 20, 20' (in step S1) and transmitted to the NFC device 1, 3 in step S2 for subsequent use as described above.

Examples of functionality changes that can be achieved by command code updates of a same embedded device (i.e. the NFC device) with a temperature sensing capability are the realization of a temperature sensor device (as an example of a function unit) that returns the current temperature to an NFC-enabled smartphone whenever touched, a temperature logger device that returns historical temperature values, or a device that returns time intervals during which a critical temperature was exceeded.

A further embodiment concerns the ability to update the command code of different function units on the embedded device. For example, the embedded device may have NFC and another wireless radio frequency communication unit such as Bluetooth, and the desire is to update, through NFC, the command code of the Bluetooth communication unit (as one function unit) independently from the command code that realizes the NFC functionality (representing another function unit). This can be achieved by selecting a function unit e.g. with appropriate metadata when providing the checksum (e.g. a cryptographic hash value) for authentication.

The disclosed verification process is rather simple and does not require any preset shared secret. The only requirement is that both the sender and receiver apply the same checksum function (e.g. cryptographic hash function), for example the commonly known SHA256 algorithm, or one of SHA-384, SHA-512, SHAKE128, SHAKE256 algorithms. If such a dynamically updatable wearable user device, e.g. an NFC tag device, is manufactured and distributed with an empty or documented command code version, the customer can easily provide its own command code version and thereby take ownership of the device for any future updates.

Thus, malicious modifications are avoided by providing that an update of command code is only possible as explained above, in particular by the legitimate owner of the NFC device (who preferably is also the owner of the reader/writer device) or by a person/entity who is authorized to update the function. Another domain of application of the present disclosure is in the field of IoT scenarios, in which the update of home sensors without the need to expose them to the Internet can be achieved. Even for Internet connected sensors it could be advantageous to perform updates through a local interface instead of the public Internet with a much larger attack vector.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. An NFC device comprising:
   a function unit configured to execute a function based on related command code,
   a storage unit configured to store the command code,
   a communication unit configured to communicate with another NFC device,
   a processing unit configured, if an update of the command code shall be made by the another NFC device, to calculate a checksum over at least part of the command code, to compare the calculated checksum with a checksum received from the another NFC device and to authorize the update if the received checksum matches the calculated checksum.

2. The NFC device as defined in embodiment 1,
   wherein the communication unit is configured, if the received checksum matches the calculated checksum, to transmit an acknowledgement notice to the another NFC device and to receive, in response to the acknowledgement notice, new command code by which the stored command code shall be updated and the storage unit is configured to update the stored command code if the received checksum matches the calculated checksum.

3. The NFC device as defined in any preceding embodiment,
   wherein the processing unit is configured to calculate a hash value over at least part of the command code as checksum.

4. The NFC device as defined in any preceding embodiment,
   wherein the communication unit is configured not to receive new command code and/or the storage unit is configured not to update the stored command code, if the received checksum does not match the calculated checksum.

5. The NFC device as defined in any preceding embodiment,
   comprising two or more function units each configured to execute a respective function based on related command code,
   wherein the processing unit is configured, if an update of selected command code related with a selected function unit shall be made by the another NFC device, to calculate a checksum over at least part of the selected command code, to compare the calculated checksum with a checksum received from the another NFC device and to authorize the update only if the received checksum matches the calculated checksum.

6. The NFC device as defined in embodiment 5,
   wherein the communication unit is configured to receive a command code selector indicating the command code that shall be updated by the another NFC device and a checksum over at least part of the selected command code.

7. The NFC device as defined in any preceding embodiment,
   wherein the communication unit is configured for performing near field communication.

8. The NFC device as defined in any preceding embodiment,
   wherein the NFC device is configured as smart card, vital signs monitor, smart phone, smart watch, wrist band or sensor device.

9. A method for authorizing an update of an NFC device, the method comprising:
   calculating a checksum over at least part of command code stored for executing a function by the NFC device, if an update of the command code shall be made by another NFC device,
   comparing the calculated checksum with a checksum received from the another NFC device, and
   authorizing the update if the received checksum matches the calculated checksum.

10. A reader/writer device comprising:
    a storage unit configure to store command code used by an NFC device to execute a function, and/or a command code indicator indicating the command code, and/or a checksum over at least part of the command code,
    a communication unit configured to communicate with the NFC device,
    a processing unit configured, if an update of the command code of the NFC device shall be made by the reader/writer device, to calculate a checksum over at least part of the stored or indicated command code or to retrieve the stored checksum from the storage unit,
    wherein the communication unit is configured to transmit the checksum to the NFC device and to transmit new command code to the NFC device for updating the command code if an authorization of the update is received from the NFC device.

11. The reader/writer device as defined embodiment 10,
    wherein said communication unit is configured to receive an acknowledgement notice from the NFC device if the checksum transmitted to the NFC device matches a checksum calculated by the NFC device over the command code that shall be updated.

12. The reader/writer device as defined in any one of embodiments 10 to 11,
    wherein the processing unit is configured to calculate a hash value over at least part of the command code as checksum.

13. The reader/writer device as defined in any one of embodiments 10 to 12,
    wherein the communication unit is configured not to transmit new command code, if an authorization of the update is not received from the NFC device.

14. The reader/writer device as defined in any one of embodiments 10 to 13,
    wherein the processing unit is configured, if an update of selected command code of a selected function unit of two or more function units of the NFC device shall be made by the reader/writer device, to calculate a checksum over at least part of the selected command code or to retrieve the stored checksum over at least part of the selected command code from the storage unit, and
    wherein the communication unit is configured to transmit the checksum of the selected command code to the NFC device and to transmit new command code to the NFC device for updating the selected command code if an authorization of the update is received from the NFC device.

15. The reader/writer device as defined in embodiment 14, wherein the communication unit is configured to transmit a command code selector indicating the command code that shall be updated to the NFC device and a checksum over at least part of the selected command code.

16. The reader/writer device as defined in any one of embodiments 10 to 15,
wherein the communication unit is configured for performing near field communication.

17. The reader/writer device as defined in any one of embodiments 10 to 16,
wherein the reader/writer device is configured as computer, smartphone, laptop or tablet.

18. A method for performing an update of an NFC device, the method comprising:
calculating a checksum over at least part of command code or retrieving a stored checksum, wherein the command code used by an NFC device to execute a function, and/or a command code indicator indicating the command code, and/or a checksum over at least part of the command code is stored in a storage unit,
transmitting the checksum to the NFC device, and
transmitting new command code to the NFC device for updating the command code if an authorization of the update is received from the NFC device.

19. A non-transitory computer-readable recording medium that stores therein a computer program product, which, when executed by a processor, causes the method according to embodiment 9 or 18 to be performed.

20. A computer program comprising program code means for causing a computer to perform the steps of said method according to embodiment 9 or 18 when said computer pro-gram is carried out on a computer.

The present application claims priority to European Patent Application 16188740.1 filed by the European Patent Office on 14 Sep. 2016, the entire contents of which being incorporated herein by reference.

The invention claimed is:

1. A near field communication (NFC) device, comprising:
processing circuitry configured to
execute a function based on a related command code;
store the command code;
communicate with another NFC device; and
when an update of the command code is to be made by the another NFC device,
calculate a first checksum over at least part of the command code,
compare the first checksum with a second checksum received from the another NFC device,
authorize the update if the second checksum matches the first checksum, and
if the update is authorized, receive an updated command code from the another NFC device.

2. The NFC device as claimed in claim 1, wherein if the second checksum matches the first checksum, the processing circuitry is configured to
transmit an acknowledgement notice to the another NFC device,
receive, in response to the acknowledgement notice, a new command code by which the stored command code is updated, and
update the stored command code.

3. The NFC device as claimed in claim 1, wherein the processing circuitry is configured to calculate a hash value over at least part of the command code as checksum.

4. The NFC device as claimed in claim 1, wherein if the second checksum does not match the first check sum, the processing circuitry does not receive a new command code or update the stored command code.

5. The NFC device as claimed in claim 1, wherein the processing circuitry communicates with the another NFC device via near field communication.

6. The NFC device as claimed in claim 1, wherein the NFC device is configured as smart card, vital signs monitor, smart phone, smart watch, wrist band or sensor device.

7. The NFC device as claimed in claim 1, wherein the processing circuitry is configured to determine whether the update of the command code is to be made by the another NFC device.

8. A method for a near field communication (NFC) device, the method comprising:
determining whether an update of a command code, stored for executing a function by the NFC device, is to be made by another NFC device; and
when the update of the command code is to be performed by the another NFC device:
calculating a first checksum over at least part of the command code;
comparing the first checksum with a second checksum received from the another NFC device; and
authorizing the update if the second checksum matches the first checksum, and
if the update is authorized, receiving an updated command code from the another NFC device.

9. A non-transitory computer-readable recording medium that stores therein a computer program product, which, when executed by a processor, causes the processor to execute the method according to claim 8.

10. A reader/writer device, comprising:
processing circuitry configured to
store a command code used by a near field communication (NFC) device to execute a function;
communicate with the NFC device;
calculate, if an update of the command code of the NFC device is to be made by the reader/writer device, a first checksum as a hash value over at least part of the stored command code; and
transmit the first checksum to the NFC device and transmit a new command code to the NFC device for updating the command code if an authorization of the update is received from the NFC device.

11. The reader/writer device as claimed in claim 10, wherein the processing circuitry is configured to receive an acknowledgement notice from the NFC device if the first checksum transmitted to the NFC device matches a second checksum calculated by the NFC device over the command code that is to be updated.

12. The reader/writer device as claimed in claim 10, wherein the processing circuitry is configured to calculate a hash value over at least part of the command code as a checksum.

13. The reader/writer device as claimed in claim 10, wherein the processing circuitry does not transmit the new command code if the authorization of the update is not received from the NFC device.

14. The reader/writer device as claimed in claim 10, wherein the processing circuitry is configured to
calculate, if an update of selected command code of a selected function of two or more function of the NFC device is be made by the reader/writer device, a checksum over at least part of the selected command code or to retrieve the stored checksum over at least part of the selected command code, and transmit the checksum of the selected command code to the NFC device and transmit new command code to the NFC device for updating the selected command code if authorization of the update is received from the NFC device.

15. The reader/writer device as claimed in claim 14, wherein the processing circuitry is configured to transmit a command code selector indicating the command code that is to be updated to the NFC device and a checksum over at least part of the selected command code.

16. The reader/writer device as claimed in claim 10, wherein the processing circuitry communicates via near field communication.

17. The reader/writer device as claimed in claim 10, wherein the reader/writer device is configured as a computer, smartphone, laptop or tablet.

18. A method for a near field communication (NFC) device, the method comprising:

calculating a first checksum over at least part of a command code or retrieving a stored checksum, wherein the command code used by an NFC device to execute a function, and/or a command code indicator indicating the command code, and/or a checksum over at least part of the command code is stored in a storage unit;

transmitting the first checksum to the NFC device; and transmitting a new command code to the NFC device for updating the command code if an authorization of the update is received from the NFC device.

19. A non-transitory computer-readable recording medium that stores therein a computer program product, which, when executed by a processor, causes the processor to execute the method according to claim 18.

\* \* \* \* \*